US011668972B2

(12) United States Patent
Takimoto et al.

(10) Patent No.: US 11,668,972 B2
(45) Date of Patent: Jun. 6, 2023

(54) DISPLAY DEVICE AND ELECTRONIC APPARATUS

(71) Applicant: Japan Display Inc., Tokyo (JP)

(72) Inventors: Akio Takimoto, Tokyo (JP); Toshiki Kaneko, Tokyo (JP); Takuo Kaitoh, Tokyo (JP); Kazuhiro Nishiyama, Tokyo (JP); Hiroyuki Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/110,374

(22) Filed: Dec. 3, 2020

(65) Prior Publication Data

US 2021/0088842 A1     Mar. 25, 2021

Related U.S. Application Data

(63) Continuation of application No. PCT/JP2019/020782, filed on May 24, 2019.

(30) Foreign Application Priority Data

Jun. 12, 2018  (JP) .............................. JP2018-111851

(51) Int. Cl.
*G02F 1/1335* (2006.01)
*G02F 1/1333* (2006.01)

(52) U.S. Cl.
CPC .... *G02F 1/133553* (2013.01); *G02F 1/13338* (2013.01); *G02F 1/133514* (2013.01); *G02F 1/133524* (2013.01); *G02F 1/133528* (2013.01)

(58) Field of Classification Search
CPC ................. H04M 1/0264; H04N 5/225; G02F 1/133553; G02F 1/13338; G02F 1/133514; G02F 1/133524; G02F 1/133528

See application file for complete search history.

(56) References Cited

U.S. PATENT DOCUMENTS

| 2006/0291240 | A1  | 12/2006 | Kim et al.     |
|--------------|-----|---------|----------------|
| 2009/0102763 | A1  | 4/2009  | Border et al.  |
| 2013/0063676 | A1  | 3/2013  | Tsuchihashi et al. |
| 2013/0176512 | A1* | 7/2013  | Posner ................. G02F 1/1333 349/193 |

(Continued)

FOREIGN PATENT DOCUMENTS

| JP | 2000-075282 A | 3/2000 |
|----|---------------|--------|
| JP | 2017-040908 A | 2/2017 |

(Continued)

OTHER PUBLICATIONS

International Search Report dated Jul. 23, 2019 in PCT/JP2019/020782 filed May 24, 2019, 1 page.

(Continued)

*Primary Examiner* — Jonathan Y Jung
(74) *Attorney, Agent, or Firm* — Maier & Maier, PLLC

(57) ABSTRACT

According to one embodiment, an electronic apparatus includes a camera, a liquid crystal panel including a display portion overlaid on the camera, a light guide having a first side surface and a main surface opposed to the liquid crystal panel and a first through hole, and a light source opposed to the first side surface. The camera is provided in the first through hole.

7 Claims, 7 Drawing Sheets

(56) References Cited

U.S. PATENT DOCUMENTS

| | | | |
|---|---|---|---|
| 2015/0316808 A1* | 11/2015 | Hirato | G02F 1/133784 |
| | | | 349/138 |
| 2016/0161664 A1* | 6/2016 | Ishida | G02B 6/0045 |
| | | | 359/230 |
| 2017/0053592 A1 | 2/2017 | Shin et al. | |
| 2017/0187934 A1* | 6/2017 | Kwak | G02F 1/1333 |
| 2017/0235398 A1* | 8/2017 | Choi | H04N 5/232 |
| | | | 345/173 |
| 2018/0026152 A1* | 1/2018 | Benson | G06F 1/1643 |
| | | | 257/82 |
| 2019/0258112 A1 | 8/2019 | Nagasaki et al. | |

FOREIGN PATENT DOCUMENTS

| | | |
|---|---|---|
| WO | WO 2015/022887 A1 | 2/2015 |
| WO | WO 2018/083817 A1 | 5/2018 |

OTHER PUBLICATIONS

Office Action dated Jun. 21, 2021, in connection with corresponding Japanese Application No. 2018111851 (10 pp., including machine-generated English translation).

Office Action dated Oct. 20, 2022 in corresponding German application No. 112019002422.1, 7 pages.

Office Action dated Feb. 11, 2023, in corresponding Chinese Application No. 201980038964.6, 9 pages.

\* cited by examiner

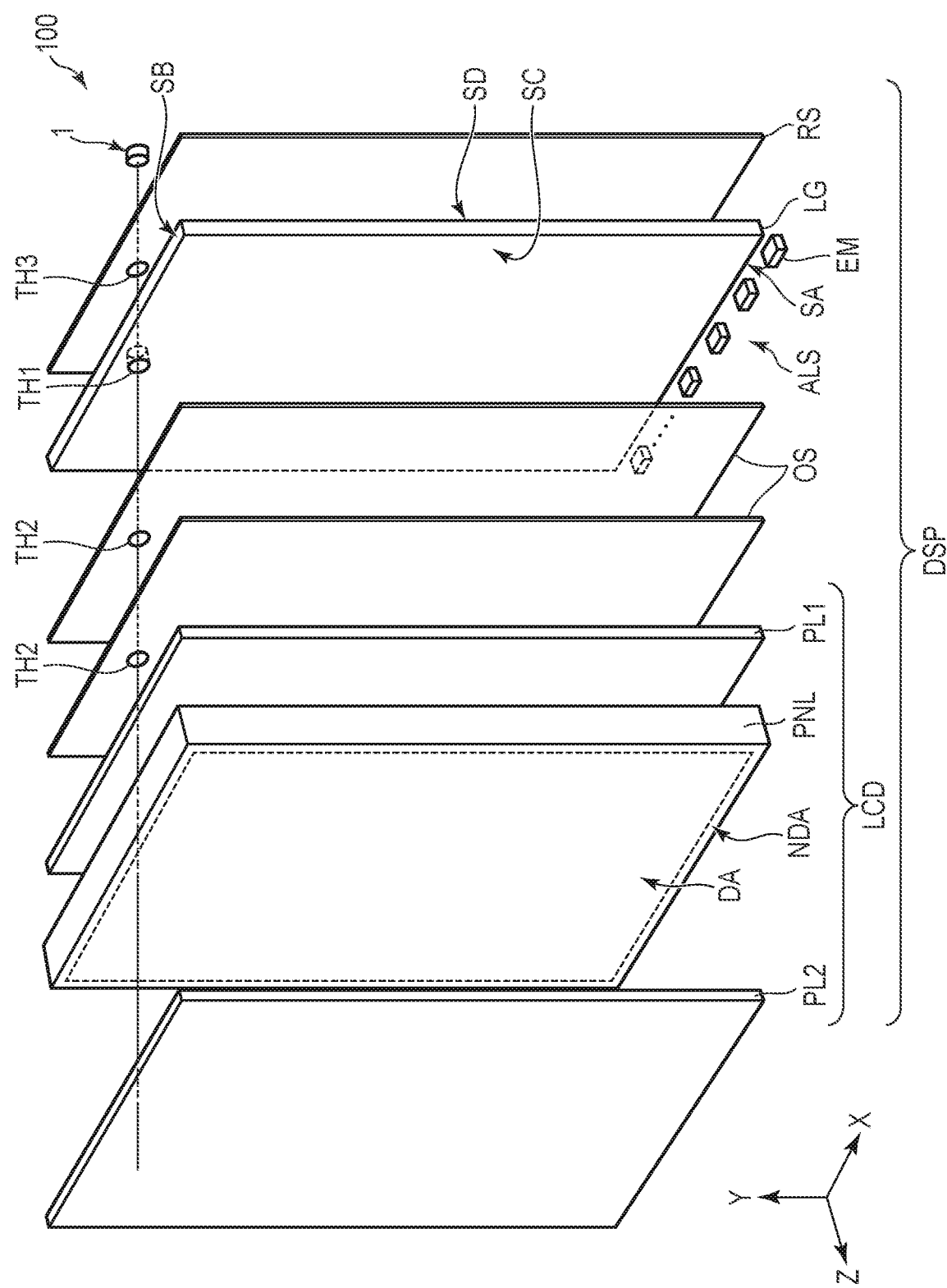
F I G. 1

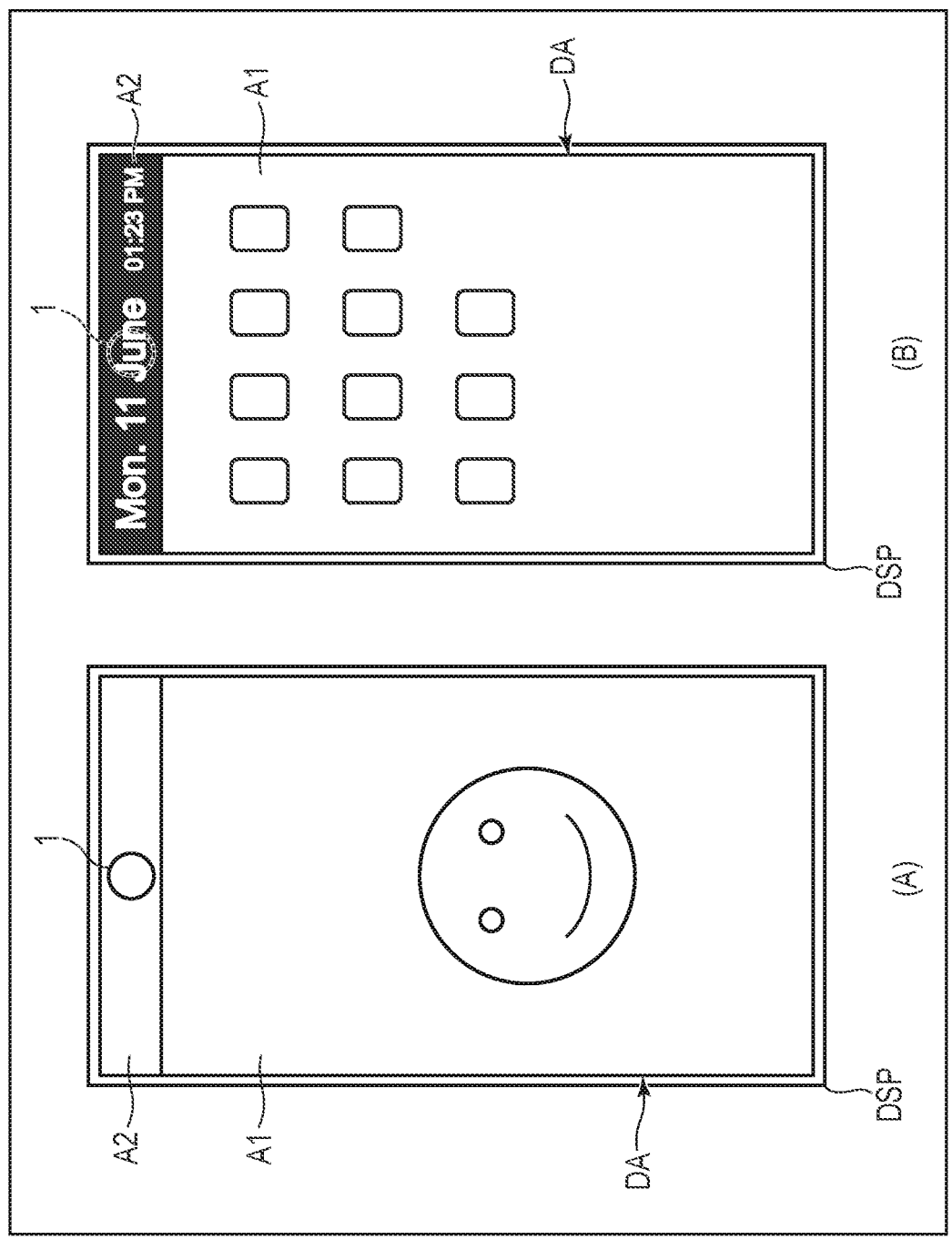
F I G. 8

DISPLAY DEVICE AND ELECTRONIC APPARATUS

CROSS-REFERENCE TO RELATED APPLICATIONS

This application is a Continuation Application of PCT Application No. PCT/JP2019/020782, filed May 24, 2019 and based upon and claiming the benefit of priority from Japanese Patent Application No. 2018-111851, filed Jun. 12, 2018, the entire contents all of which are incorporated herein by reference.

FIELD

Embodiments described herein generally relate to a display device and an electronic apparatus having the same built therein.

BACKGROUND

Recently, electronic apparatuses such as a smartphone comprising a display portion and a camera on the same surface side have been widely put into practical use. In such an electronic apparatus, the camera is provided outside the display portion. Demands to reduce an outer frame width of the display portion while maintaining a space to install the camera have been increased.

BRIEF DESCRIPTION OF THE DRAWINGS

FIG. 1 is an exploded perspective view showing a first configuration example of a display device DSP according to the embodiments.

FIG. 8 is a diagram showing a display example of the display device DSP according to the embodiments.

DETAILED DESCRIPTION

Figure 2:
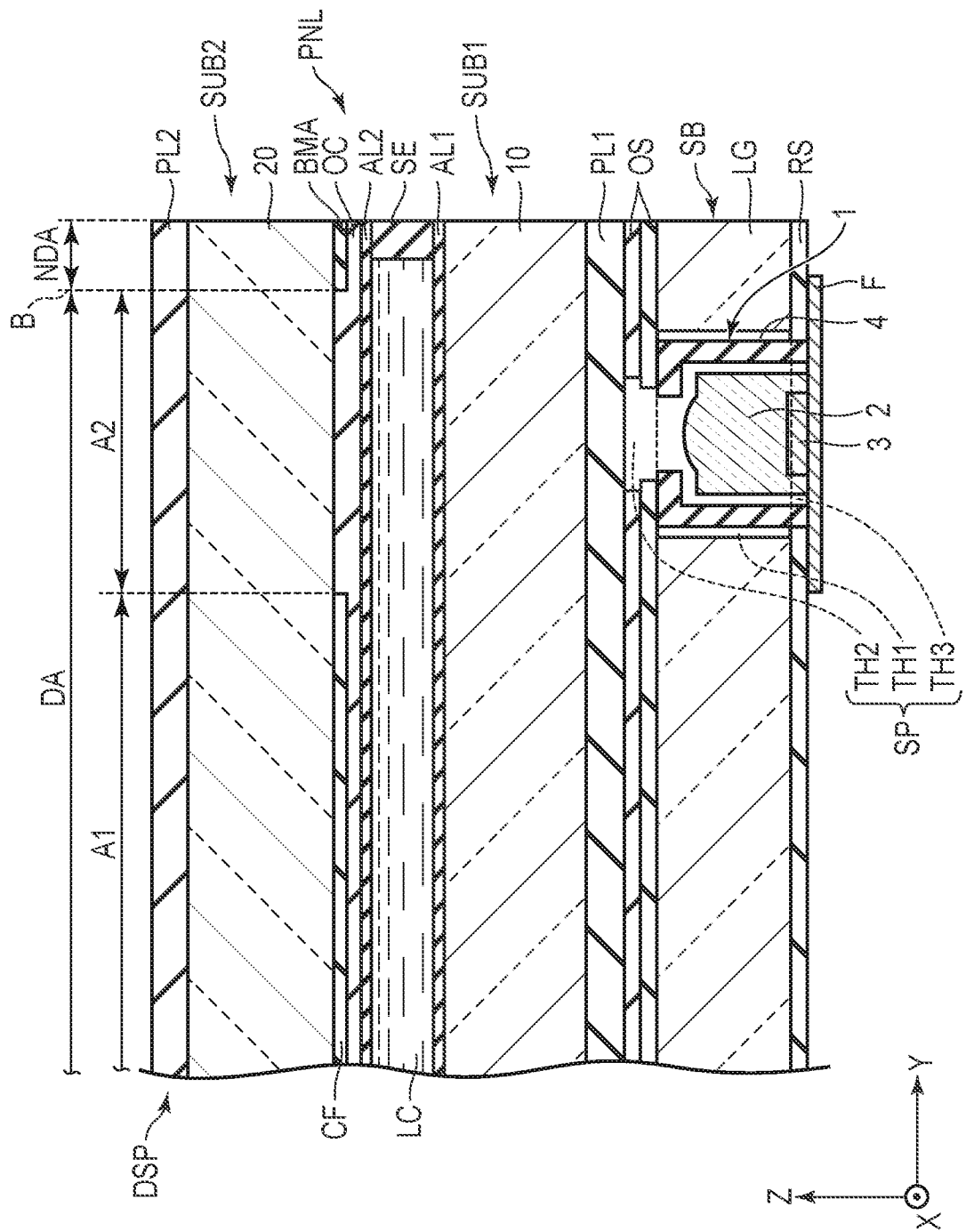
FIG. 2 is a cross-sectional view including the display device DSP and a camera 1 shown in FIG. 1.

In general, according to one embodiment, there is provided an electronic apparatus comprising: a camera; a liquid crystal panel comprising a display portion overlaid on the camera; a light guide having a first side surface, a main surface opposed to the liquid crystal panel, and a first through hole; and a light source opposed to the first side surface. The camera is provided in the first through hole.

According to another embodiment, there is provided an electronic apparatus comprising: a camera; a liquid crystal panel comprising a display portion overlaid on the camera; a first light guide having a first side surface, a second side surface on a side opposite to the first side surface, and a first main surface opposed to the liquid crystal panel; a first light source opposed to the first side surface; a second light guide having a third side surface opposed to the second side surface, a fourth side surface, a second main surface opposed to the liquid crystal panel, and a first through hole; and a second light source opposed to the fourth side surface. The first side surface, the second side surface, and the third side surface extend in a first direction. The fourth side surface extends in a second direction intersecting the first direction. The camera is provided in the first through hole.

According to another embodiment, there is provided a display device comprising: a planar light source; a liquid crystal element arranged on the planar light source; and a driver driving the liquid crystal element. A through hole is provided at a part of the planar light source. The driver controls a transmissivity of the liquid crystal element in an area corresponding to the through hole to guide capturing light to a camera arranged in or through the through hole of the planar light source.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is an exploded perspective view showing a first configuration example of a display device DSP according to the embodiments. For example, the first direction X, the second direction Y, and the third direction Z are orthogonal to each other but may intersect at an angle other than 90 degrees. The first direction X and the second direction Y correspond to the directions parallel to the main surface of a substrate constituting the display device DSP, and the third direction Z corresponds to the thickness direction of the display device DSP.

The display device DSP comprises a first polarizer PL1, a second polarizer PL2, a liquid crystal panel PNL, optical sheets OS, a light guide LG, light sources EM, and a reflective sheet RS. The reflective sheet RS, the light guide LG, the optical sheets OS, the first polarizer PL1, the liquid crystal panel PNL, and the second polarizer PL2 are arranged in this order in the third direction Z. A plurality of light sources EM are spaced apart and arranged in the first direction X. At least the light sources EM and the light guide LG constitute a planar light source ALS that illuminates the liquid crystal panel PNL. The planar light source ALS may further include an optical sheet OS and a reflective sheet RS. The first polarizer PL1, the second polarizer PL2, and the liquid crystal panel PNL constitute a liquid crystal element LCD. The liquid crystal element LCD is arranged on the planar light source ALS.

An electronic apparatus 100 in which such a display device DSP is built comprises a camera 1.

The liquid crystal panel PNL is formed in a flat plate parallel to the X-Y plane defined by the first direction X and the second direction Y. The liquid crystal panel PNL is located between the first polarizer PL1 and the second polarizer PL2. The liquid crystal panel PNL comprises a display portion DA which displays an image and a non-display portion NDA in a frame shape surrounding the display portion DA. In the present embodiments, the liquid crystal panel PNL is overlaid on the camera 1 in the third direction Z and, particularly, the display portion DA is overlaid on the camera 1. Descriptions of a detailed structure of the liquid crystal panel PNL are omitted here. However, the liquid crystal panel PNL may comprise any one of configurations corresponding to a display mode using a lateral electric field along the main surface of the substrate, a display mode using a longitudinal electric field along the normal of the main surface of the substrate, a display mode using an inclined electric field which is tilted obliquely with respect to the main surface of the substrate, and a display mode using an appropriate combination of the above lateral electric field, longitudinal electric field, and inclined electric field. The main surface of the substrate is a surface parallel to the X-Y plane.

The first polarizer PL1 and the second polarizer PL2 are overlaid on at least the display portion DA with respect to the liquid crystal panel PNL. In addition, the first polarizer PL1 and the second polarizer PL2 are overlaid on the camera 1 in the third direction Z.

The light guide LG has a first side surface SA opposed to the light sources EM, a second side surface SB on a side opposite to the first side surface SA, a main surface SC opposed to the liquid crystal panel PNL, a main surface SD on a side opposite to the main surface SC, and a first through hole TH1. The first through hole TH1 is located between the first side surface SA and the second side surface SB in the second direction Y and is closer to the second side surface SB than to the first side surface SA. The camera 1 is overlaid on the first through hole TH1 in the third direction Z.

A plurality of optical sheets OS are located between the light guide LG and the liquid crystal panel PNL and is opposed to the main surface SC. Each of the optical sheets OS has a second through hole TH2 overlaid on the first through hole TH1. The optical sheets OS are, for example, prism sheets or diffusion sheets.

The reflective sheet RS is opposed to the main surface SD. That is, the light guide LG is located between the reflective sheet RS and the optical sheets OS. The reflective sheet RS has a third through hole TH3 overlaid on the first through hole TH1. The third through hole TH3, the first through hole TH1, and the second through hole TH2 are arranged in this order in the third direction Z and are provided in line. For example, the reflective sheet RS may be fixed to a frame formed of a metal. In this case, a through hole overlaid on the first through hole TH1 may also be provided in the frame.

For example, the light sources EM are light-emitting diodes (LED), which emit white illumination light. The illumination light emitted from the light sources EM is made incident from the first side surface SA to travel in a direction of an arrow indicative of the second direction Y. Then, the illumination light guided by the light guide LG is emitted from the main surface SC toward the liquid crystal panel PNL to illuminate the liquid crystal panel PNL. The liquid crystal panel PNL, the first polarizer PL1, and the second polarizer PL2 display an image by allowing the illumination light to be selectively transmitted on the display portion DA.

FIG. 2 is a cross-sectional view including the display device DSP and a camera 1 shown in FIG. 1. The liquid crystal panel PNL comprises a first substrate SUB1, a second substrate SUB2, a liquid crystal layer LC, and a sealant SE. The sealant SE is located in the non-display portion NDA to bond the first substrate SUB1 and the second substrate SUB2 and to seal the liquid crystal layer LC.

Main parts of the first substrate SUB1 and the second substrate SUB2 will be simply described below. The first substrate SUB1 comprises a first insulating substrate 10 and an alignment film AL1. The second substrate SUB2 comprises a second insulating substrate 20, a color filter CF, a light-shielding layer BMA, a transparent layer OC, and an alignment film AL2.

The first insulating substrate 10 and the second insulating substrate 20 are transparent substrates such as glass substrates or flexible resin substrates. The alignment films AL1 and AL2 are in contact with the liquid crystal layer LC.

The color filter CF, the light-shielding layer BMA, and the transparent layer OC are located between the second insulating substrate 20 and the liquid crystal layer LC.

The light-shielding layer BMA is located in the non-display portion NDA. A boundary B between the display portion DA and the non-display portion NDA corresponds to an inner side edge of the light-shielding layer BMA. The sealant SE is provided at a position overlaid on the light-shielding layer BMA.

Details of the color filter CF are omitted here. For example, however, the color filter CF comprises color filters of respective red, green, and blue colors. The transparent layer OC covers the color filter CF and the light-shielding layer BM. For example, the transparent layer OC is a transparent organic insulating film.

In the present embodiments, the display portion DA has a first area A1 where the color filter CF is arranged and a second area A2 where the color filter CF is not arranged. The transparent layer OC is arranged across the first area A1 and the second area A2, is in contact with the color filter CF in the first area A1, and is in contact with the second insulating substrate 20 in the second area A2. When the relationship in position between the camera 1 and the display portion DA is focused, the camera 1 is overlaid on the second area A2. That is, the color filter CF is not overlaid on the camera 1.

The first polarizer PL1 is bonded to the first insulating substrate 10. The second polarizer PL2 is bonded to the second insulating substrate 20. The first polarizer PL1 and the second polarizer PL2 are arranged across the first area A1 and the second area A2 and overlaid on the camera 1. Incidentally, the liquid crystal element LCD may comprise a retardation film, a scattering layer, an antireflective layer, and the like as needed.

The first through hole TH1, the second through hole TH2, and the third through hole TH3 are overlaid on each other to form a space SP opened to a lower part of the liquid crystal panel PNL. The camera 1 is provided in the space SP formed by the first through hole TH1, and the like. For example, the camera 1 comprises an optical system 2 including at least one lens, an image sensor (imaging device) 3, and a casing 4. The casing 4 accommodates the optical system 2 and the image sensor 3. The optical system 2 is located between the liquid crystal panel PNL and the image sensor 3, and the camera 1 can receive light through the liquid crystal panel PNL. The camera 1 is electrically connected to a wiring substrate F. Incidentally, the camera 1 does not need to be provided in the first through hole TH1 but may be provided outside the space SP. In any way, the camera 1 needs only to be provided at a position overlaid on the first through hole TH1 in the third direction Z. In the present embodiments, the example of providing the camera 1 overlaid on the first through hole TH1 has been described. However, a photoreceiver receiving the light emitted through the first through hole TH1 and the optical system 2 and outputting an electric signal may be overlaid on the first through hole TH1.

According to the present embodiments, the camera 1 is overlaid on the display portion DA of the liquid crystal panel PNL. For this reason, space to install the camera 1 in the non-display portion NDA does not need to be provided. Therefore, the frame width of the non-display portion NDA can be reduced as compared with a case where the camera 1 is overlaid on the non-display portion NDA or a case where the camera 1 is not overlaid on the display portion DA but the camera 1 and the liquid crystal panel PNL are arranged in the second direction Y.

In addition, since the camera 1 is not overlaid on the color filter CF, the light made incident on the camera 1 through the liquid crystal panel PNL is hardly influenced by the color filter CF. For this reason, undesired absorption and coloring by the color filter CF can be suppressed.

In the example illustrated in FIG. 2, the color filter CF is provided on the second substrate SUB2, but may be provided on the first substrate SUB1.

Figure 3:
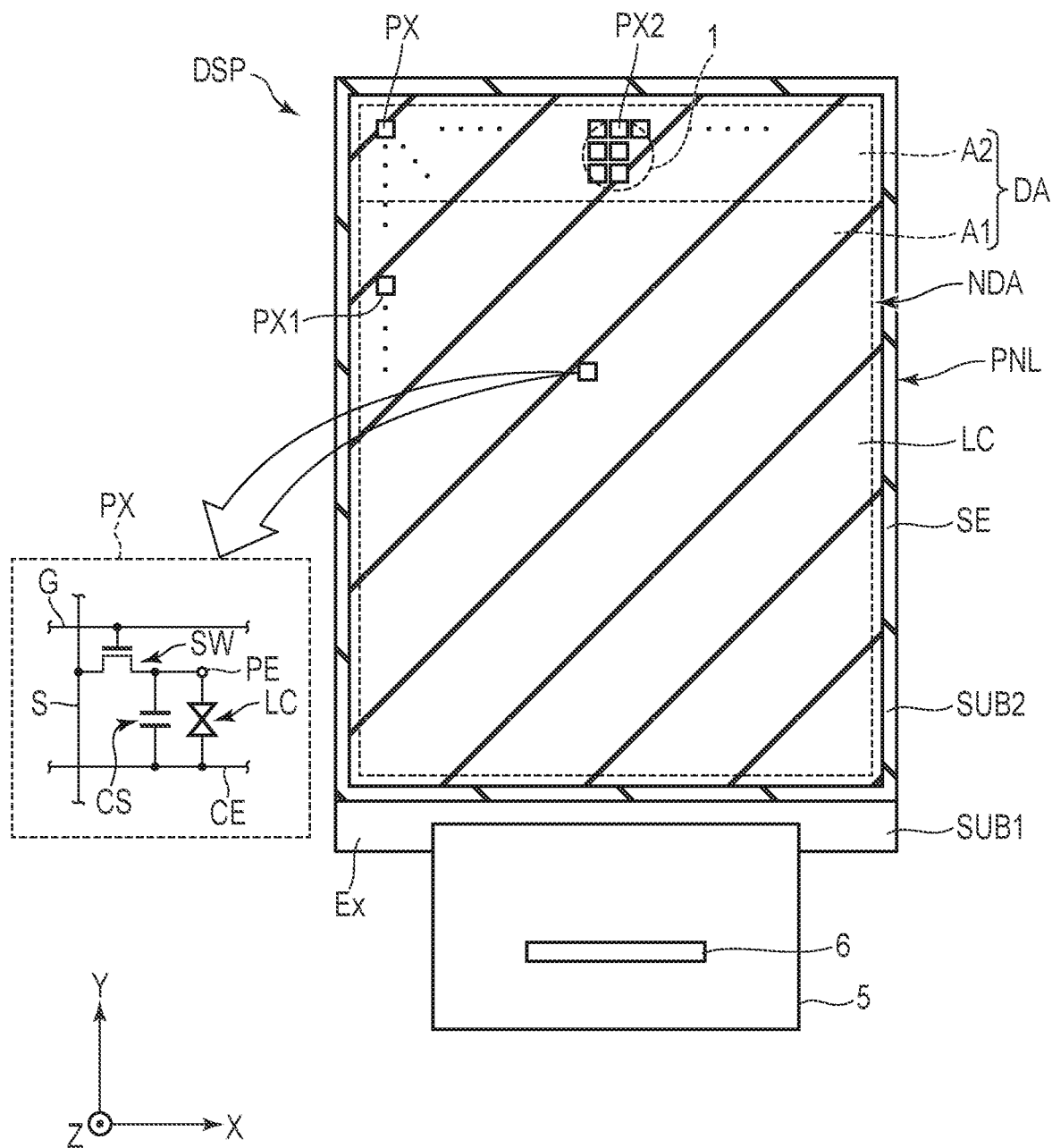
FIG. 3 is a plan view showing a configuration example of the liquid crystal panel PNL shown in FIG. 1.

FIG. 3 is a plan view showing a configuration example of the liquid crystal panel PNL shown in FIG. 1. In FIG. 3, the liquid crystal layer LC and the sealant SE are represented by different oblique lines. The display portion DA is a substantially quadrangular area that does not include a notch portion and is located in an inner side surrounded by the sealant SE.

In the display portion DA, the first area A1 and the second area A2 are arranged in the second direction Y. As described with reference to FIG. 2, the first area A1 is an area where the color filter CF is arranged, and the second area A2 is an area where the color filter CF is not arranged. That is, the second area A2 is a monochromatic display area and corresponds to an area where stepwise display from white (or transparent) display to black display can be performed. That is, in the second area A2, halftone (gray) display can also be performed. In contrast, the first area A1 corresponds to an area where color display can be performed. In the example illustrated in FIG. 3, the second area A2 includes an area overlaid on the camera 1 and extends in the first direction X. Incidentally, the second area A2 may be the only area overlaid on the camera 1. In this case, the first area A1 is expanded to an area around the camera 1.

The liquid crystal panel PNL comprises pixels PX arrayed in a matrix in the first direction X and the second direction Y, in the first area A1 and the second area A2 of the display portion DA. First pixels PX1 included in the first area A1 are not overlaid on the camera 1. The second area A2 includes second pixels PX2 overlaid on the camera 1. Each of the pixels PX in the display portion DA has the same circuit configuration.

As shown and enlarged in FIG. 3, each pixel PX comprises a switching element SW, a pixel electrode PE, a common electrode CE, a liquid crystal layer LC and the like. The switching element SW is constituted by, for example, a thin-film transistor (TFT) and is electrically connected to a scanning line G and a signal line S. The pixel electrode PE is electrically connected to the switching element SW. Each pixel electrode PE is opposed to the common electrode CE, and drives the liquid crystal layer LC by an electric field produced between the pixel electrode PE and the common electrode CE. A capacitor CS is formed, for example, between an electrode with the same potential as the common electrode CE and an electrode with the same potential as the pixel electrode PE.

A wiring substrate 5 is electrically connected to an extended portion Ex of the first substrate SUB1. An IC chip 6 is electrically connected to the wiring substrate 5. Incidentally, the IC chip 6 may be electrically connected to the extended portion Ex. The IC chip 6 incorporates, for example, a display driver which outputs a signal necessary for image display, and the like. The wiring substrate 5 is a foldable flexible printed circuit.

Figure 4:
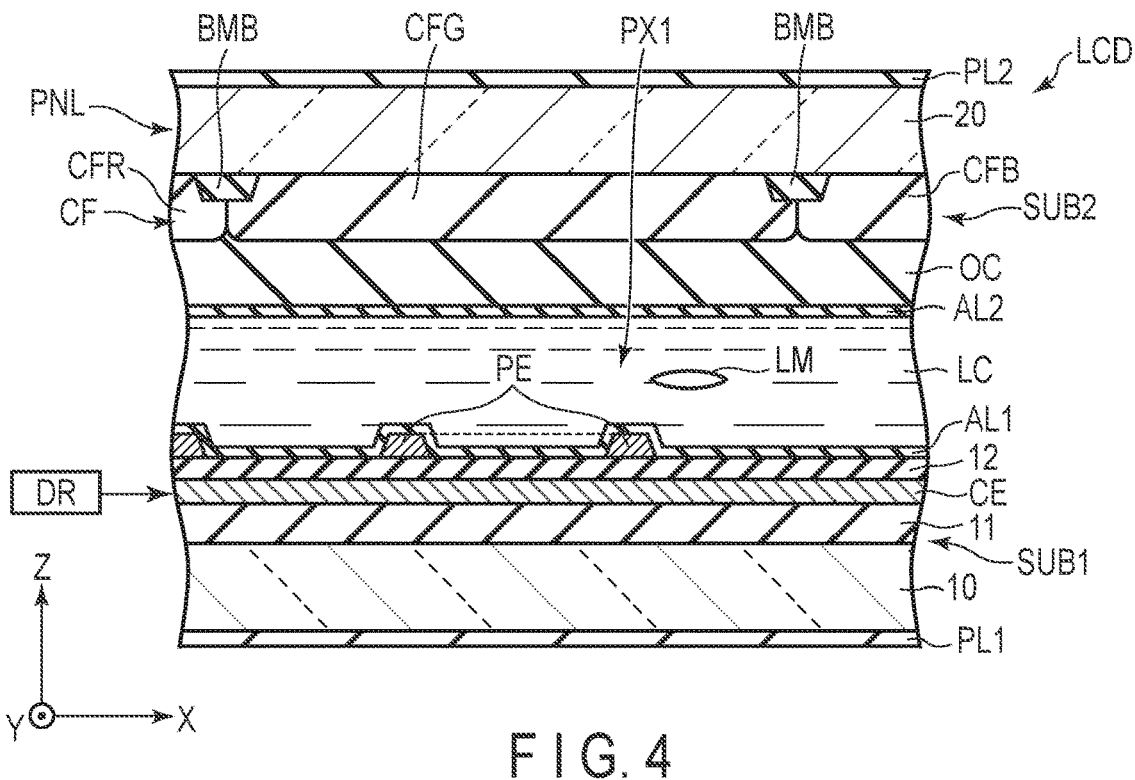
FIG. 4 is a cross-sectional view showing a liquid crystal element LCD including a first pixel PX1 shown in FIG. 3.

FIG. 4 is a cross-sectional view showing a liquid crystal element LCD including a first pixel PX1 shown in FIG. 3. The liquid crystal element LCD comprising the liquid crystal panel PNL corresponding to the display mode utilizing the lateral electric field between the first polarizer PL1 and the second polarizer PL2 will be described here.

The first substrate SUB1 comprises insulating films 11 and 12, a common electrode CE, and pixel electrodes PE between the first insulating substrate 10 and the alignment film AL1. Incidentally, for example, the scanning line G, the signal line S, and the switching element SW shown in FIG. 3 are located between the first insulating substrate 10 and the common electrode CE. The common electrode CE is located on the insulating film 11 and covered with the insulating film 12. The pixel electrodes PE are located on the insulating film 12 and covered with the alignment film AL1. The pixel electrodes PE are opposed to the common electrode CE through the insulating film 12. The common electrode CE and the pixel electrodes PE are formed of a transparent conductive material such as indium-tin-oxide (ITO) or indium-zinc-oxide (IZO). The insulating film 11 is not described in detail, but includes an inorganic insulating film and an organic insulating film. The insulating film 12 is, for example, an inorganic insulating film of a silicon nitride or the like.

In the second substrate SUB2, a light-shielding layer BMB is formed integrally with the light-shielding layer BMA of the non-display portion NDA described with reference to FIG. 2. The color filter CF includes a red colored filter CFR, a green colored filter CFG, and a blue colored filter CFB. The colored filter CFG is opposed to the pixel electrodes PE. The other colored filters CFR and CFB are also opposed to the other pixel electrodes PE (not shown).

A driver DR driving the liquid crystal element LCD outputs a signal necessary for image display to each pixel PX of the display portion DA and controls the transmissivity of the liquid crystal element LCD. The transmissivity of the first pixel PX1 shown in FIG. 4 is controlled in accordance with the magnitude of the voltage applied to the liquid crystal layer LC.

In the first pixel PX1, in an off state in which no voltage is applied to the liquid crystal layer LC, liquid crystal molecules LM contained in the liquid crystal layer LC are subjected to initial alignment in a predetermined direction between the alignment films AL1 and AL2. In such an OFF state, the light guided from the light sources EM shown in FIG. 1 to the first pixel PX1 is absorbed by the first polarizer PL1 and the second polarizer PL2. For this reason, the first pixel PX1 in the OFF state displays black.

In contrast, in an ON state in which a voltage is applied to the liquid crystal layer LC, the liquid crystal molecules LM are aligned in a direction different from the initial alignment direction by the electric field formed between the pixel electrodes PE and the common electrode CE, and the alignment direction is controlled by the electric field. In such an ON state, part of the light guided to the first pixel PX1 is transmitted through the first polarizer PL1 and the second polarizer PL2. For this reason, the first pixel PX1 in the ON state displays the color corresponding to the color layer CF.

Figure 5:
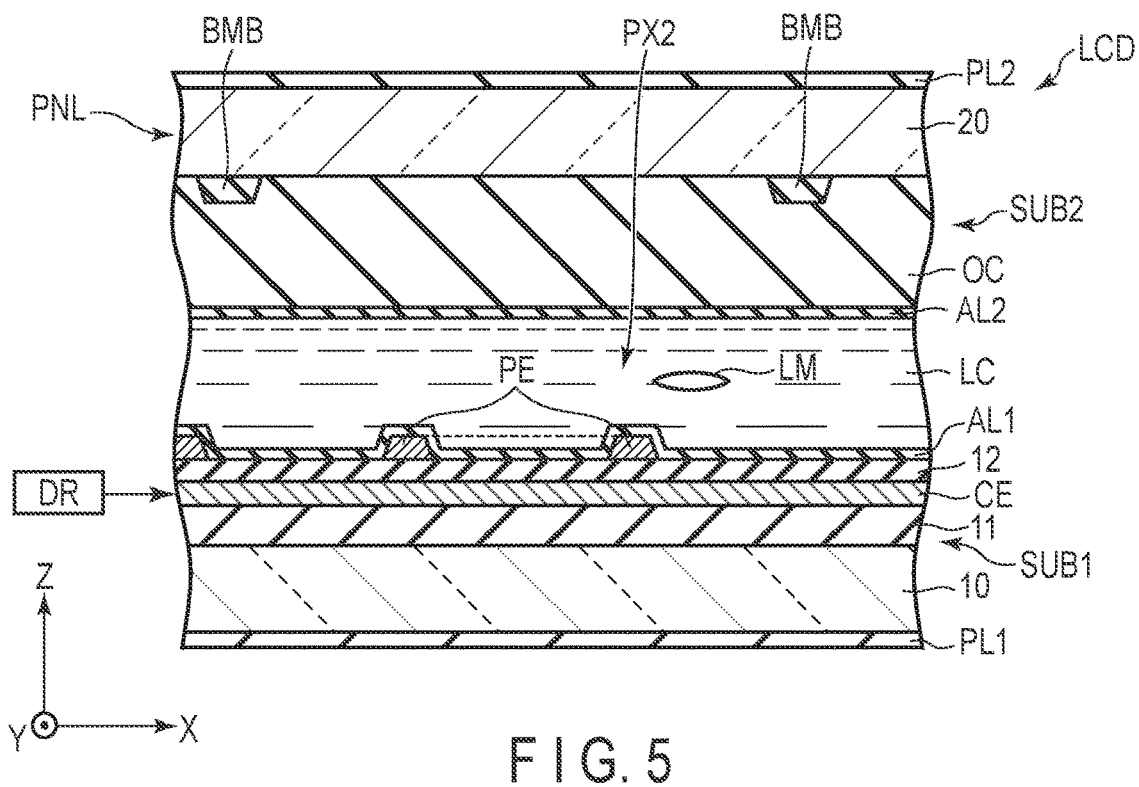
FIG. 5 is a cross-sectional view showing a liquid crystal element LCD including the second pixels PX2 shown in FIG. 3.

FIG. 5 is a cross-sectional view showing a liquid crystal element LCD including the second pixels PX2 shown in FIG. 3. The second pixel PX2 is different from the first pixel PX1 shown in FIG. 4 with respect to a feature that the second substrate SUB2 does not comprise the color filter CF. That is, the transparent layer OC is in contact with the second insulating substrate 20 directly above the pixel electrodes PE.

The transmissivity of the second pixel PX2 shown in FIG. 5 is controlled by the driving portion DR, similarly to the first pixel PX1. In the OFF state in which no voltage is applied to the liquid crystal layer LC, the second pixel PX2 has the minimum transmissivity and displays black, similarly to the first pixel PX1.

In contrast, in the ON state in which a voltage is applied to the liquid crystal layer LC, part of the light guided to the second pixel PX2 is transmitted through the first polarizer PL1 and the second polarizer PL2. The second pixel PX2 in the ON state displays a white color or becomes transparent with the maximum transmissivity. In addition, as described above, the second pixel PX2 may be controlled to have a transmissivity between the minimum transmissivity and the maximum transmissivity and may display a gray color.

In the present embodiments, the light-shielding layer BMB is formed in the first area A1 and the second area A2. However, the width of the light-shielding layer BMB in the second area A2 may be narrower than the width of the light-shielding layer BMB in the first area A1. Furthermore, the light-shielding layer BMB may not be provided in the second area A2. The width of the light-shielding layer BMB may be narrowed or the light-shielding layer BMB may not be provided in the first direction X, or the second direction Y, or both the first direction X and the second direction Y.

Figure 6:
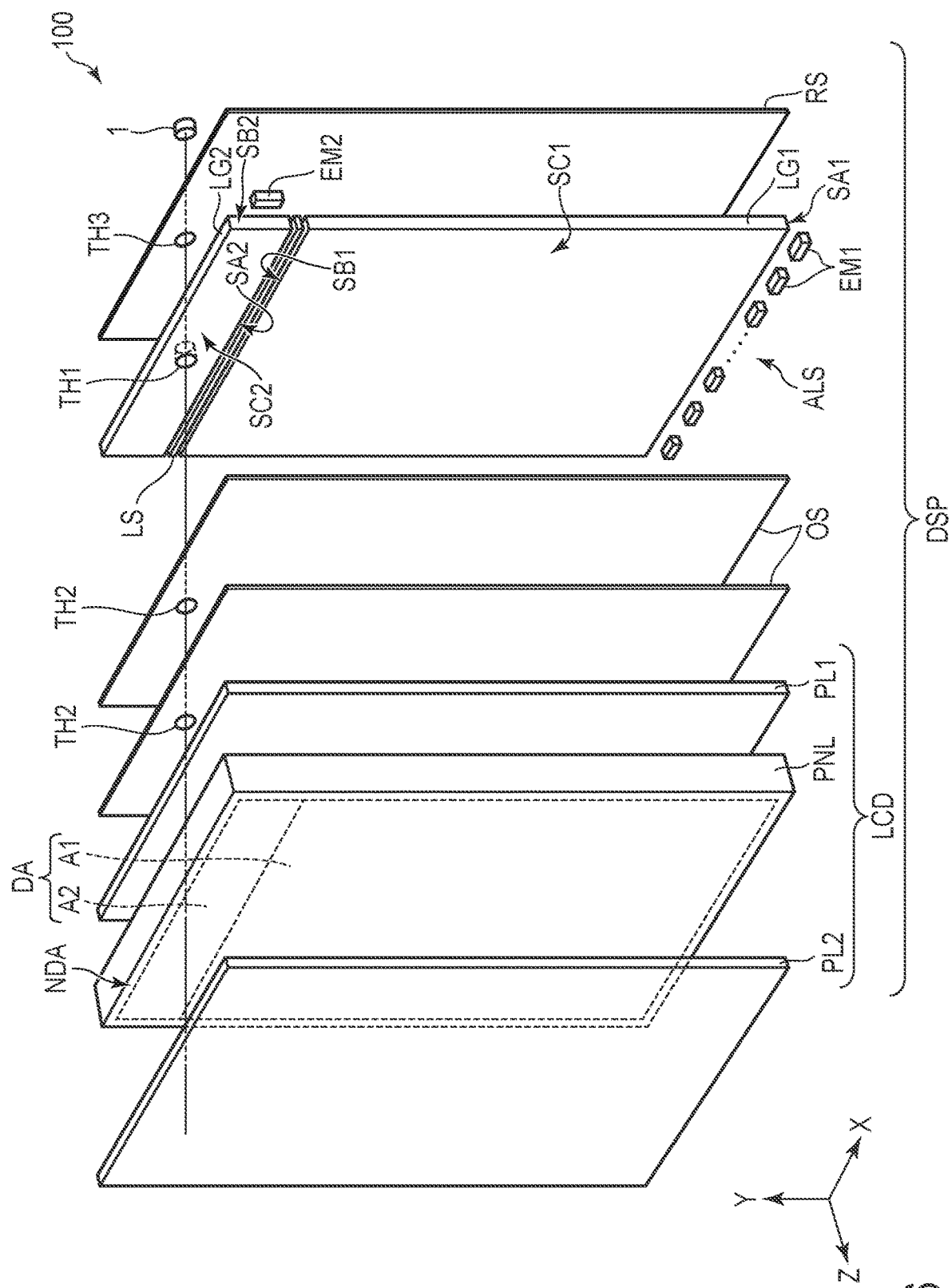
FIG. 6 is an exploded perspective view showing a second configuration example of a display device DSP according to the present embodiments.

FIG. 6 is an exploded perspective view showing a second configuration example of a display device DSP according to the present embodiments. The second configuration example is different from the first configuration example shown in FIG. 1 with respect to a feature that the display device DSP comprises a first light guide LG1, a second light guide LG2, a first light source EM1, a second light source EM2, and a light-shielding layer LS. The first light guide LG1 and the second light guide LG2 are arranged in the second direction Y. In the example illustrated, the first light guide LG1 is overlaid on the first area A1, and the second light guide LG2 is overlaid on the second area A2.

The first light guide LG1 has a first side surface SA1, a second side surface SB1 on a side opposite to the first side surface SA1, and a first main surface SC1 opposed to the liquid crystal panel PNL. The first light sources EM1 are opposed to the first side surface SA1. The first light guide LG1 is not overlaid on the camera 1 or does not have a through hole.

The second light guide LG2 has a third side surface SA2 opposed to the second side surface SB1, a fourth side surface SB2, and a second main surface SC2 opposed to the liquid crystal panel PNL. The second light source EM2 is opposed to the fourth side surface SB2. The first side surface SA1, the second side surface SB1, and the third side surface SA2 extend in the first direction X. The fourth side surface SB2 extends in the second direction Y. The second light guide LG2 has a first through hole TH1 overlaid on the camera 1.

The optical sheets OS extend between the first light guide LG1 and the liquid crystal panel PNL, and between the second light guide LG2 and the liquid crystal panel PNL. The optical sheets OS have second through holes TH2 overlaid on the first through hole TH1.

The first light guide LG1 and the second light guide LG2 are located between the reflective sheet RS and the optical sheets OS. The reflective sheet RS has a third through hole TH3 overlaid on the first through hole TH1.

The camera 1 is provided in the first through hole TH1, similarly to that described with reference to FIG. 2.

The light-shielding layer LS is located between the second side surface SB1 and the third side surface SA2. The light-shielding layer LS is located on the opposite side to the first light source EM1 with the first light guide LG1 interposed therebetween. Such a light-shielding layer LS suppresses the light from the first light sources EM1 being made incident to the second light guide LG2 through the first light guide LG1. The light-shielding layer LS may be a light absorbing body or a light reflective body. The light-shielding layer LS is provided to be in contact with the second side surface SB1, but may be in contact with the third side surface SA2 or may be remote from the third side surface SA2.

In such a second configuration example, the light from the first light sources EM1 illuminates the first area A1 through the first light guide LG1. In addition, the light from the second light source EM2 illuminates the second area A2 through the second light guide LG2. In FIG. 6, the second light source EM2 is provided on the only shorter side of the second light guide LG2 but is not particularly limited. The second light sources EM2 may be provided on two opposed shorter sides of the second light guide LG2. Alternatively, the second light source EM2 may be configured to be provided on the longer side of the second light guide LG2, similarly to the first light sources EM1 for the first light guide LG1. In addition, the first light sources EM1 can be provided on the longer side of the first light guide LG1, the second light source EM2 can be provided on the shorter side of the second light guide LG2, and the first light sources EM1 and the second light source EM2 can be arranged in line. In this case, the first light sources EM1 and the second light source EM2 can be provided on the same circuit board.

In the second configuration example, too, the same advantages as those of the first configuration example can be obtained. In addition, when the user turns off the second light source EM2 in use of the camera 1, the light made incident on the camera 1 through the second area A2 hardly receives an influence from the light from the first light sources EM1 and the second light source EM2 even if the first light sources EM1 illuminate. For this reason, the quality of the captured images can be improved.

Figure 7:
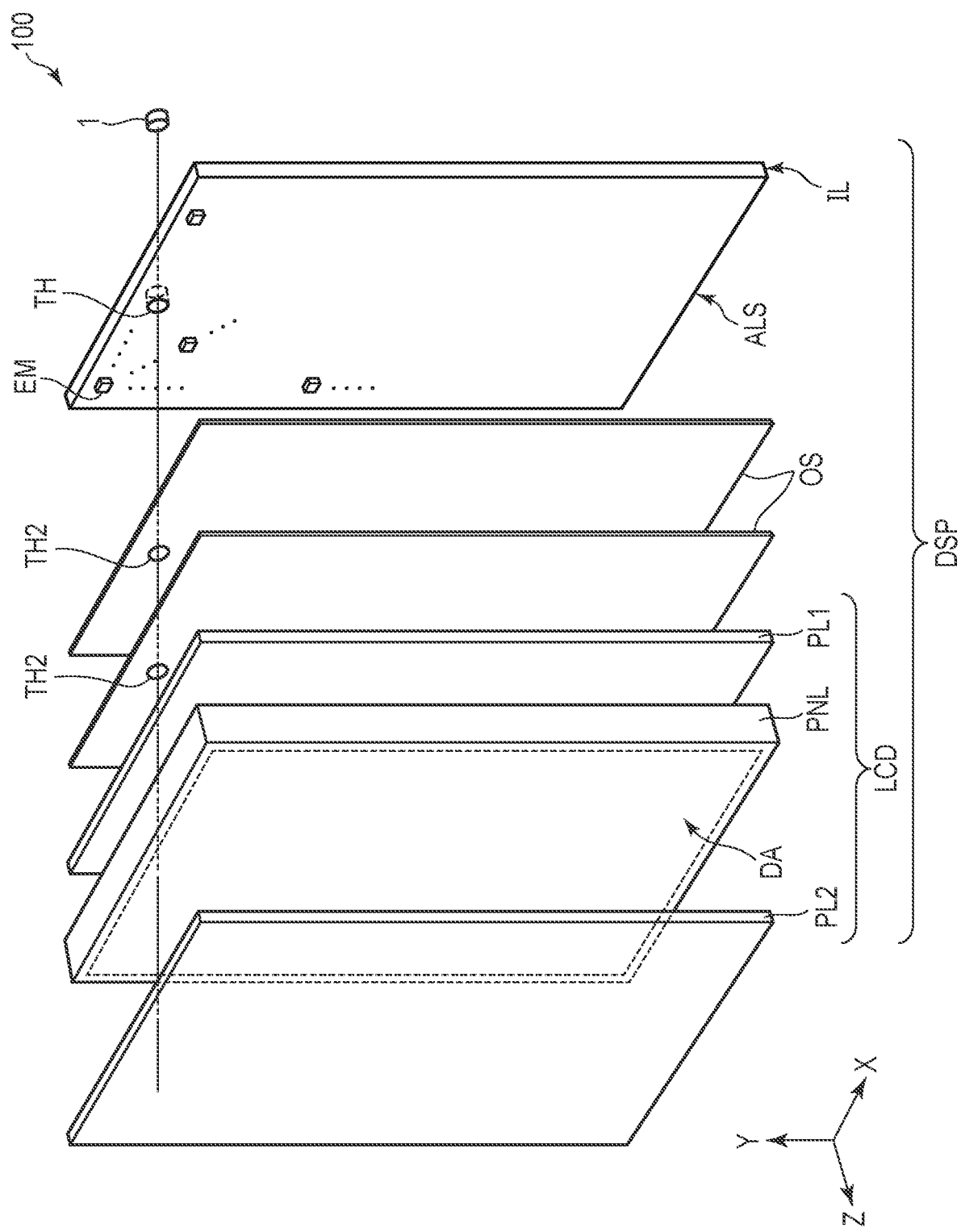
FIG. 7 is an exploded perspective view showing a third configuration example of a display device DSP according to the embodiments.

FIG. 7 is an exploded perspective view showing a third configuration example of a display device DSP according to the embodiments. The third configuration example is different from the first configuration example shown in FIG. 1 with respect to a feature that the display device DSP does not comprise the light guide LG or the reflective sheet RS but comprises an illumination substrate IL. The illumination substrate IL constitutes the planar light source ALS and is arranged directly under the liquid crystal panel PNL. The illumination substrate IL comprises light sources EM arrayed in a matrix in the first direction X and the second direction Y. The illumination substrate IL has a through hole TH overlaid on the camera 1. In such an illumination substrate IL, the light sources EM are not arranged at positions overlaid on the camera 1.

In the third configuration example, too, the same advantages as those of the first configuration example can be obtained. In addition, since the light sources EM are arranged in a substantially whole area of the display portion DA, the luminance of the display portion DA can be made uniform. Furthermore, a high contrast ratio can be implemented and the display quality can be improved by setting the light sources EM overlaid on a bright part of the image displayed on the display portion DA to high luminance and setting the light sources EM overlaid on a dark part to low luminance.

FIG. 8 is a diagram showing a display example of the display device DSP according to the embodiments. (A) of FIG. 8 corresponds to a display example in the capturing mode of capturing with the camera 1. Such a capturing mode is, for example, a mode in which the user of the display device DSP captures himself/herself as a subject. On the display portion DA, the second area A2 overlaid on the camera 1 is, for example, transparent and the subject captured by the camera 1 is displayed in the first area A1. A pixel overlaid on the camera 1 corresponds to the second pixel PX2 described with reference to FIG. 5 and becomes optically transmissive by applying the voltage to the liquid crystal layer LC. That is, the light transmitted through the second polarizer PL2 is transmitted through the liquid crystal panel PNL and the first polarizer PL1 and received by the camera 1. Incidentally, the second pixel PX2 overlaid on the camera 1 is desirably set to have a highest transmissivity at the capturing. For example, however, when the second pixel is made to function as an ND (Neutral Density) filter, halftone display (gray display) can be set. The optical concentration can be arbitrarily set by appropriately adjusting the transmissivity of the second pixel PX2.

A pixel included in the first area A1 corresponds to the first pixel PX1 described with reference to FIG. 4 and displays the image captured by the camera 1.

(B) of FIG. 8 corresponds to a display example in a case where the camera 1 is not used. Characters such as numbers, letters, symbols, and marks are displayed as monochromatic display in the second area A2. In addition, the characters can also be displayed at positions overlaid on the camera 1. In the first area A1, still images, moving images and the like are displayed as color display besides the home screen as shown in the drawing.

In addition, in the above embodiments, the example of using white light-emitting diodes (LED) as the light sources EM has been described. However, light-emitting diodes (LED) of different colors such as red, blue and green colors may be arranged and used. In addition, in this case, so called a field sequential system of sequentially making the light-emitting diodes (LED) of the respective colors illuminate, sequentially changing the respective color display, and thereby implementing color display, can also be employed. Thus, the color display can be implemented in both the first area A1 and the second area A2 of the display portion DA without arranging the color filter CF in both the areas. In addition, the color filter CF may be arranged in the first area A1 while the color filter CF may not be arranged in the second area A2, and the color display may be implemented by employing the field sequential system in the second area A2.

As described above, according to the present embodiments, a display device with a frame capable of being narrowed and the electronic apparatus in which the same is built can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a camera;
a liquid crystal panel comprising a display portion overlaid on the camera and a non-display portion surrounding the display portion;
a light guide including a first side surface, a main surface opposed to the liquid crystal panel, and a first through hole; and
a light source opposed to the first side surface,
the camera being provided in the first through hole,
the liquid crystal panel including a first insulating substrate, a second insulating substrate, a liquid crystal layer located between the first insulating substrate and the second insulating substrate, a color filter layer, and a transparent layer on the color filter layer,
the display portion comprising a first area and a second area,
the first area including a first pixel that is not overlaid on the camera,
the second area including a second pixel overlaid on the camera,
the color filter layer being arranged on the first pixel and being not arranged on the second pixel,
in the first pixel, the color filter layer and the transparent layer being located between the second insulating substrate and the liquid crystal layer,
in the second pixel, the transparent layer being in contact with the second insulating substrate.

2. The electronic apparatus of claim 1, wherein
the light guide has a second side surface on a side opposite to the first side surface, and
the second side surface is closer to the first through hole than to the first side surface.

3. The electronic apparatus of claim 2, further comprising:
an optical sheet located between the light guide and the liquid crystal panel,
wherein
the optical sheet has a second through hole overlaid on the first through hole.

4. The electronic apparatus of claim 3, further comprising:
a reflective sheet,
wherein
the light guide is located between the reflective sheet and the optical sheet, and
the reflective sheet has a third through hole overlaid on the first through hole.

5. The electronic apparatus of claim 1, further comprising:
an optical sheet located between the light guide and the liquid crystal panel,
wherein
the optical sheet has a second through hole overlaid on the first through hole.

6. The electronic apparatus of claim 5, further comprising:
a reflective sheet,
wherein
the light guide is located between the reflective sheet and the optical sheet, and
the reflective sheet has a third through hole overlaid on the first through hole.

7. The electronic apparatus of claim 1, further comprising:
a first polarizer; and
a second polarizer,
wherein the liquid crystal panel is located between the first polarizer and the second polarizer, and the first polarizer and the second polarizer are overlaid on the camera.

* * * * *